United States Patent [19]
Price et al.

[11] Patent Number: 5,442,691
[45] Date of Patent: Aug. 15, 1995

[54] METHOD AND APPARATUS FOR CALL ROUTING IN SWITCHED DIGITAL NETWORKS USING CALL CONTROL TABLES

[75] Inventors: Steven Price, Overton; Barry J. Worley, Bannister Park, both of England

[73] Assignee: International Business Machines Corporation, Armonk, N.Y.

[21] Appl. No.: 156,860

[22] Filed: Nov. 23, 1993

[30] Foreign Application Priority Data

Dec. 22, 1992 [GB] United Kingdom ............... 9226711

[51] Int. Cl.⁶ .................................................. H04M 7/00
[52] U.S. Cl. .................................... 379/220; 379/284; 379/272; 370/58.2
[58] Field of Search ............... 379/220, 207, 290, 229, 379/230, 201, 272, 273, 284, 269; 370/58.2, 58.3, 60, 62

[56] References Cited

U.S. PATENT DOCUMENTS

| | | | |
|---|---|---|---|
| 4,310,727 | 1/1982 | Lawser | 379/207 |
| 4,754,479 | 6/1988 | Bicknell et al. | 379/207 |
| 4,791,665 | 12/1988 | Bogart et al. | 379/207 |
| 5,164,983 | 11/1992 | Brown et al. | 379/207 X |
| 5,241,588 | 8/1993 | Babson, III et al. | 379/230 X |
| 5,289,535 | 2/1994 | Bogart et al. | 379/220 X |

Primary Examiner—James L. Dwyer
Assistant Examiner—Daniel S. Hunter
Attorney, Agent, or Firm—Stephen T. Keohane

[57] ABSTRACT

A method and apparatus for routing calls in a switched digital network and a processor for use in such a network are provided in which tables of call control information store information for different categories of call control information in separate parts of the table or in separate tables. The information in the tables is available for different network entities to share in routing calls. The separation of different categories of information simplifies the task of making changes to call control tables and can allow certain of the separate tables to be portable across the network.

9 Claims, 4 Drawing Sheets

| CALL TYPE NAME | CALL CONTROL INFORMATION |
|---|---|
| | |
| | |
| | |
| | |
| | |

FIG. 2
PRIOR ART

| NAME | ADDRESS DETAILS |
|---|---|
| | |
| | |
| | |
| | |
| | |
| | |
| | |
| | |

| NAME | SECURITY DETAILS |
|---|---|
| | |
| | |
| | |
| | |
| | |
| | |
| | |
| | |

| NAME | PROTOCOL DETAILS |
|---|---|
| | |
| | |
| | |
| | |
| | |
| | |
| | |
| | |

FIG. 3

500 - ISDN
510 - CENTRAL PROCESSOR NODE
520 - REMOTE PROCESSOR NODE
530 - LINKS OF ISDN

METHOD AND APPARATUS FOR CALL ROUTING IN SWITCHED DIGITAL NETWORKS USING CALL CONTROL TABLES

BACKGROUND OF THE INVENTION

1. Field of Invention

The present invention relates to routing of calls within switched digital networks such as an integrated switched digital network (ISDN).

2. Prior Art

An ISDN is a digital end-to-end telecommunications network of wide bandwidth which supports voice, data and other services. ISDN is defined by a set of internationally agreed standards specified in the so-called "Blue books" of recommendations of the International Telegraph and Telephone Consultative Committee (CCITT). Further information about ISDN can be found in, for example, "ISDN Explained" by J. Griffiths (Wiley, 1990) and "ISDN: An Introduction" by W. Stallings (MacMillan, 1989).

In communications systems supporting switched networks, because several users share the same circuits, it is often necessary for each system to have call control mechanisms for routing incoming calls to one of several possible application programs (i.e. user-level computer programs) and for making outgoing calls to remote systems or devices. For present purposes "a system" is intended to refer to a processor and any related components connected thereto. In an ISDN, the actual routing of outgoing calls is controlled by the underlying network using information provided as part of the call control mechanism.

To make an outgoing call requires a combination of different types of call control information: address details of the called party and whatever security information is required by the called party. Information as to the communications protocol to be used in the call may also be required. The communications protocol governs the procedures used to exchange information between parties to the call. A protocol definition generally includes specifications of message formats, sequencing rules concerning messages, and interpretation rules. Examples of ISDN protocols are X25, LAPB, and SDLC (information on such protocols is available in the aforementioned CCITT Blue books and the book "ISDN Explained"). Most communications systems do not support interactive negotiation of protocols; instead the calling party attempts to make a call using a specific protocol in combination with specific security and address information, and the called party either rejects or accepts the call and the call is routed according to this specific call information.

Control over the routing of an individual system's incoming calls to specific application programs may use security and protocol information without any address information. Alternatively, an address information component may also be used.

Call information for both incoming and outgoing calls is often held in the named entries of a call control table, allowing call-related application programs to share the common information in the call control table. This also allows information to be changed by updating table entries rather than by changing application programs, which can be expensive and inconvenient. Such a call control table is used in the IBM ISDN Coprocessor Support Program Version 1.1 (IBM is a registered trademark of International Business Machines Corporation).

A call control table is normally built and updated by a configuration process performed by the system user. The user generally creates a file in which each entry comprises a call type name and a particular combination of call control information such as address, security and protocol details. Application-dependent information may also be included. For call control tables for outgoing calls, the call type name is generally the called party number of a network entity (i.e. of a particular processor within the network, or of an individual end-point device or application program at a shared processor) but may be some other designation of that entity. The file is then loaded into accessible memory (When the relevant communications network is an ISDN, this may be the memory of an ISDN Adapter). In attempting to make a call to a remote entity, a system user or local application program specifies the type of call to be made in terms of the name which has been given to a particular call type, which can be the name of the called entity. The call control table for outgoing calls is scanned to detect a matching entry of call control information for the specified call type and, if a match is found, the call control information is passed to the network, which uses it to route the call. At the processor of the called entity, a call control table is scanned for entries corresponding to the call control information transmitted by the network. If a corresponding entry is found it is then determined whether a particular entity will accept the call. A called entity such as an application program running at a data processor within the network can state which call types it wishes to receive and make by specifying entries of the relevant call control information in the call control table.

One of the problems with such call control tables is that there may be considerable duplication of information across the table (for example with a number of different entries including the same protocol information) and, since all separate entries must be updated when any changes to the call control table are required, changes to the table are time consuming and error prone. Furthermore, since the system user must define the call information of each entry in his call control table, each user creates a different table which is not portable to other systems in the network.

OBJECTS OF THE INVENTION

Accordingly, the present invention provides an improved method of routing calls between processors or within a processor in a switched digital network and a processor for use in such a network.

The method comprises steps of establishing a call control table storing call control information for specific call types; in response to a request from one of the processors for a call of a specific type to be made, examining the call control table for call control information for the call type; and using the call control information stored for the call type to route the call; wherein call control information is separated into different categories of information and separate entries for each of the different categories of call control information are stored in a call control table.

Preferably, separate call control tables are established at a processor for incoming calls and for outgoing calls respectively (hereinafter referred to as an incoming call routing table and an outgoing call directory table respectively). It is also desirable that the separation of entries for each different category of call control information takes the form of a distinct separate table for each category within a call control table. The separation into different tables for different categories enables the different tables to be made portable across the network.

In a preferred embodiment of the invention it is unnecessary for there to be a plurality of entries of a particular information element in any one category of call control information for a particular information element, with provision for a single entry to be usable for a plurality of different call types. This avoidance of duplication, which is made possible by separating out the different categories, simplifies the task of making changes to the table.

It may be provided for individual application programs at each processor to specify—in terms of the call control information types stored in the call routing table for incoming calls—which call types they will accept. A record of which application programs are set up to accept which call types is then associated with the table for incoming calls. This record may be updated dynamically as applications change the call types they are prepared to receive.

BRIEF DESCRIPTION OF DRAWINGS

In order that the present invention may be more clearly understood, embodiments of the invention will now be described in more detail by way of example only with reference to the accompanying drawings in which:

FIG. 2 shows an example of a prior art call control table structure;

FIG. 3 shows a call control table for outgoing calls as is incorporated in an embodiment of the present invention.

DETAILED DESCRIPTION OF THE PREFERRED EMBODIMENT

Figure 1:
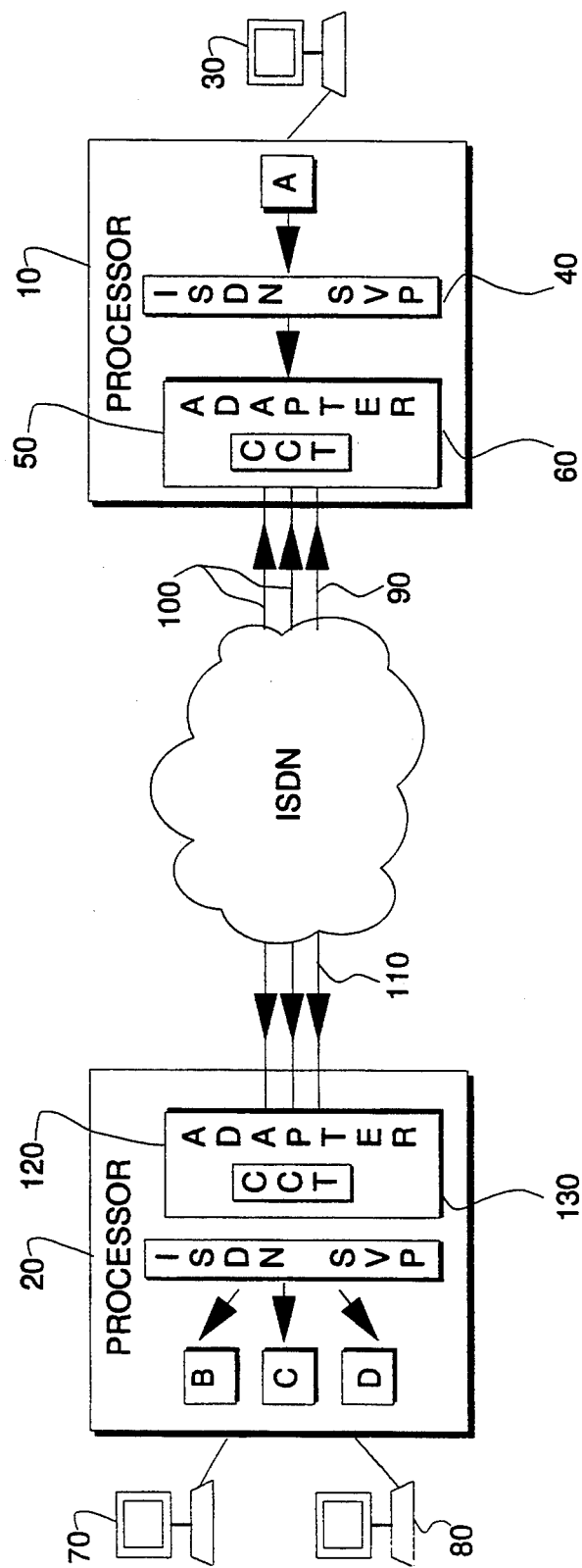
FIG. 1 shows schematically two remote systems of an ISDN each storing call control tables appropriate for implementation of the present invention.

Two communicating processors 10,20 of an ISDN are shown in FIG. 1. Each processor may connect to a number of other processors (which are not shown) within the ISDN. A system user at a first workstation 30 runs an application program A at a first processor 10. The application A uses an ISDN support program 40 and call information from a call control table (CCT) 50 stored in the memory of an adapter 60 to enable the ISDN to route an outgoing call to a remote processor 20 and to a particular one of the workstations 70,80 at the remote processor.

A standard ISDN link comprises three channels: a "D-channel" 90 which is used for signaling—for example in setting up and finishing calls—and two "B-channels" 100 which are available for the user's data. The remote processor 20 uses the call information transmitted down the D-channel 110 of its link with the ISDN and compares it with the named entries of a call routing table (CRT) 120 held in the memory of an adapter 130 at the called processor 20, to determine whether to accept the call and to which of a plurality of application programs B,C,D to route the call.

A system user generally creates call control table (CCT) entries for use by the application programs running at the local processor, for the remote processors accessed through the ISDN and for any entities of the network which are connected to the remote processors. These entries represent the types of call that it is possible to make from and to receive at the local processor. It is known in the art for an individual processor to have separate call control tables for incoming and outgoing calls.

Figures 2, 3:
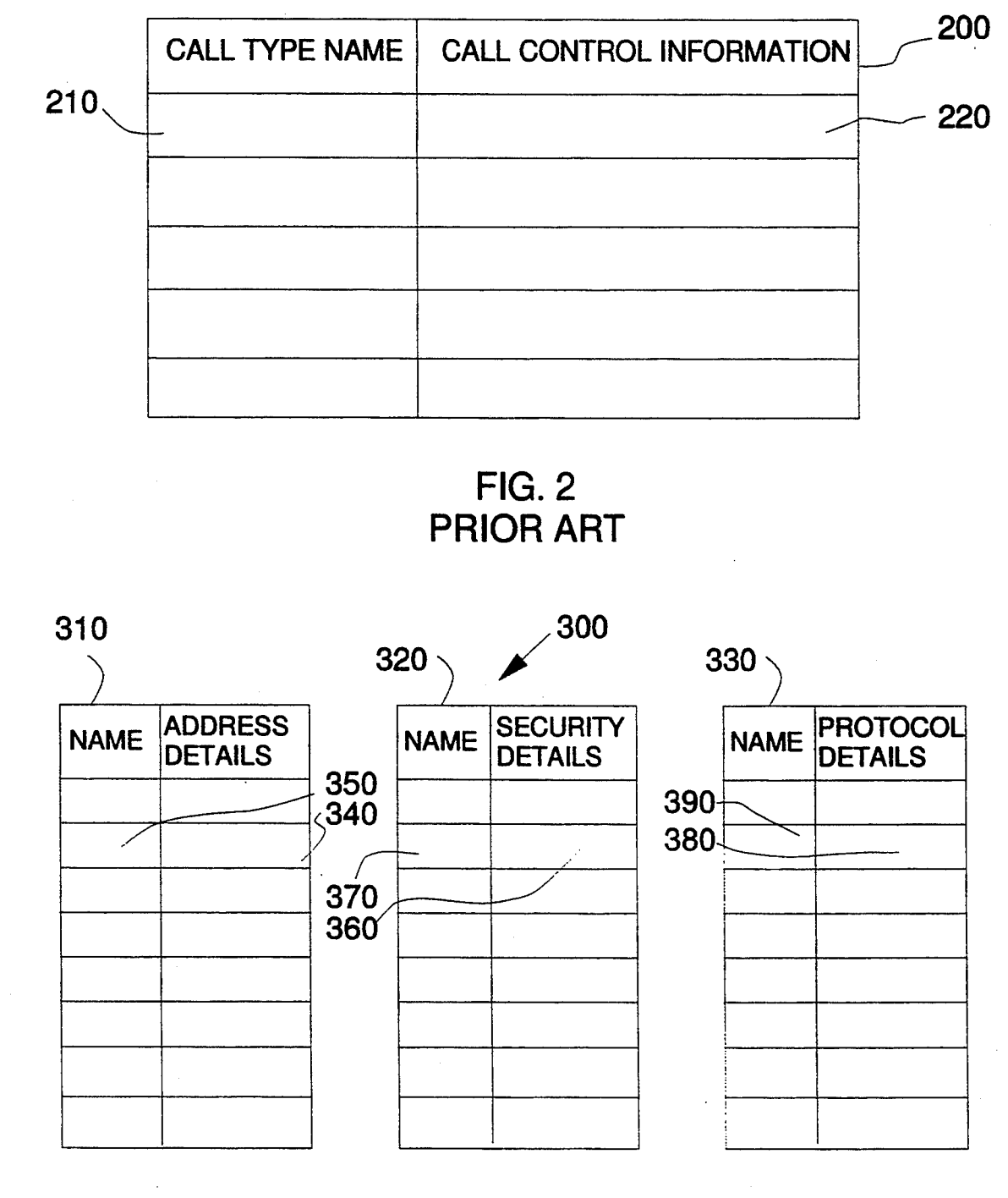

An outgoing call directory table structure such as is known in the art is shown in FIG. 2. Each entry in the table 200 comprises a name 210 of a specific call type, and associated call control information 220. A call type name may comprise the name of a network entity (e.g. CUSTOMER1). Each processor of the network may have a permanent name, whereas multiple system users accessing the system via a common data processor are defined with user-assignable names under either operator or application control. The call control information entry 220 includes address details such as a called party number (which number is the called party's public ISDN phone number where the call is between remote network entities) and subaddress information elements to specify a particular entity within a shared data processor. Security information, such as passwords or a calling party number, and protocol information, needed to specify how information is to be exchanged between parties to the call, are generally also included in the call control information entries.

An application program (or system user) wishing to route a call to a specific remote network entity specifies an appropriate call type name. Because call types are specified in terms of call type names 210 for which associated call control information 220 is stored in the call control table, the application programs do not need to know how a call is routed. The call directory table is scanned for an entry for the specified call type and, if a match is found, the call is made using the call control information stored as an entry 220 in the table. Entries higher in the table take precedence so that a call will be routed to the first name in the table for which a match is found.

A call routing table (CRT) for incoming calls is very similar, except that the entries do not necessarily include address details. Entities such as application programs running at the called processor specify which types of call they will accept, for example in terms of their security and protocol requirements. Other parameters may be used in addition or as alternatives for determining whether a call will be accepted. No two application programs can specify the same combination of acceptance criteria and thereby listen for the same calls at the same time. Security and protocol information for incoming calls is conveyed to the local node via the local ISDN D-channel. The routing table is scanned for an entry matching the transmitted call control information. If a matching table entry is found it is then determined whether an application program is set up to accept such a call: if an application program is listening for calls of such a type, the matching table entry is used to provide call control information enabling communication via the ISDN B-channels. If a matching entry is found but no application is currently set up to accept such call types, the call is generally rejected. Also, if there is no matching table entry then the incoming call is generally rejected.

Both static and dynamic routing tables are known. In the former, all table entries are fully defined before the initiation of any calls. In the latter, names corresponding to specific applications and call types can be added and deleted dynamically (or alternatively can be enabled and disabled) as required and not only before call-related application programs are run.

A call routing directory table for use when routing outgoing ISDN calls according to an embodiment of the present invention is shown in FIG. 3. How such a directory and a routing table for incoming calls are used is discussed in relation to FIG. 4. The table 300 comprises a plurality of separate parts 310,320,330 which each contain call control information of a different category. For each different call type, a first table entry 340 is made of the address details for routing the call together with the name 350 of the remote data processor or particular device (e.g. an entry including the called party number and any subaddress). Security information required to meet the security acceptance criteria of the remote processor or device to be called is stored as an entry 360 in a separate part 320 of the table 300, together with a name 370 for the security type (e.g. an entry including the calling party number and user-to-user information which is carried to the remote user transparently without network interpretation). A third table entry in another separate part of the table comprises information 380 relating to the protocol to be used together with the name 390 of the protocol.

Other outgoing call types will have similar multiple entries in the call directory table for the different categories of call control information, but there is no necessity for duplication of call control information in the directory table of the present invention. Each call control information entry may be used for a plurality of different call types. For example, where another call type from the same application program comprises calls to the same remote application program using the same security information but a different communication protocol, then it is not necessary to make new routing table entries for the categories of information which are repeated. Instead, the only necessary addition to the call routing table for this second call type is an entry of the new protocol (name and details) to be used. However, there is no reason why identical call control information elements should not be included in a single category's part of the table, as long as their respective names are different. Names must be unique in any category's part of the table.

Figure 4:
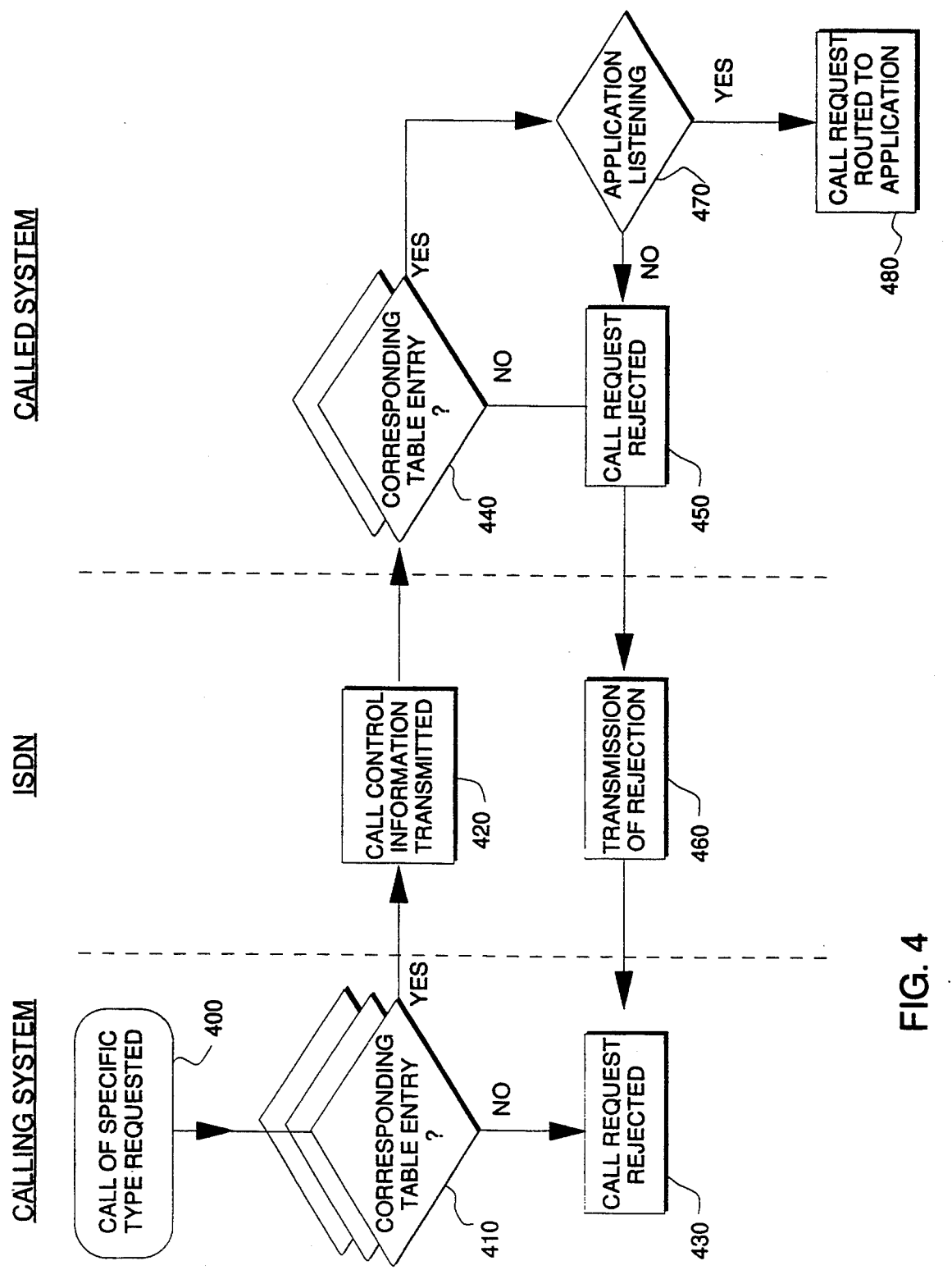
FIG. 4 is a block diagram of a method of routing calls according to an embodiment of the present invention.

An application wishing to connect to a remote system user usually specifies at 400 in FIG. 4, the user's remote name (for example, CUSTOMER1), the name of the security type (e.g. SECURITY1), and the name of the communication protocol (e.g. LAPB). The directory table 300 will be scanned sequentially in 410 for an entry corresponding to this call type and the call will be routed in 420 by the ISDN according to the call control information which is accessed. The call is rejected at 430 if the table has no corresponding entry. However, a feature of the separation of call control information categories is that a call can be set up without necessarily specifying all of the call control parameters. Null parameters can be used for entries that the system user chooses not to specify. For example, an application could specify that communication is required with a named system user with a specific protocol, where that user has no security acceptance requirements. Another example is that a request could specify a remote user's name and security type and not specify a protocol: the directory table is then examined to determine what protocol is required for a call with the specified address and security details.

Figure 5:
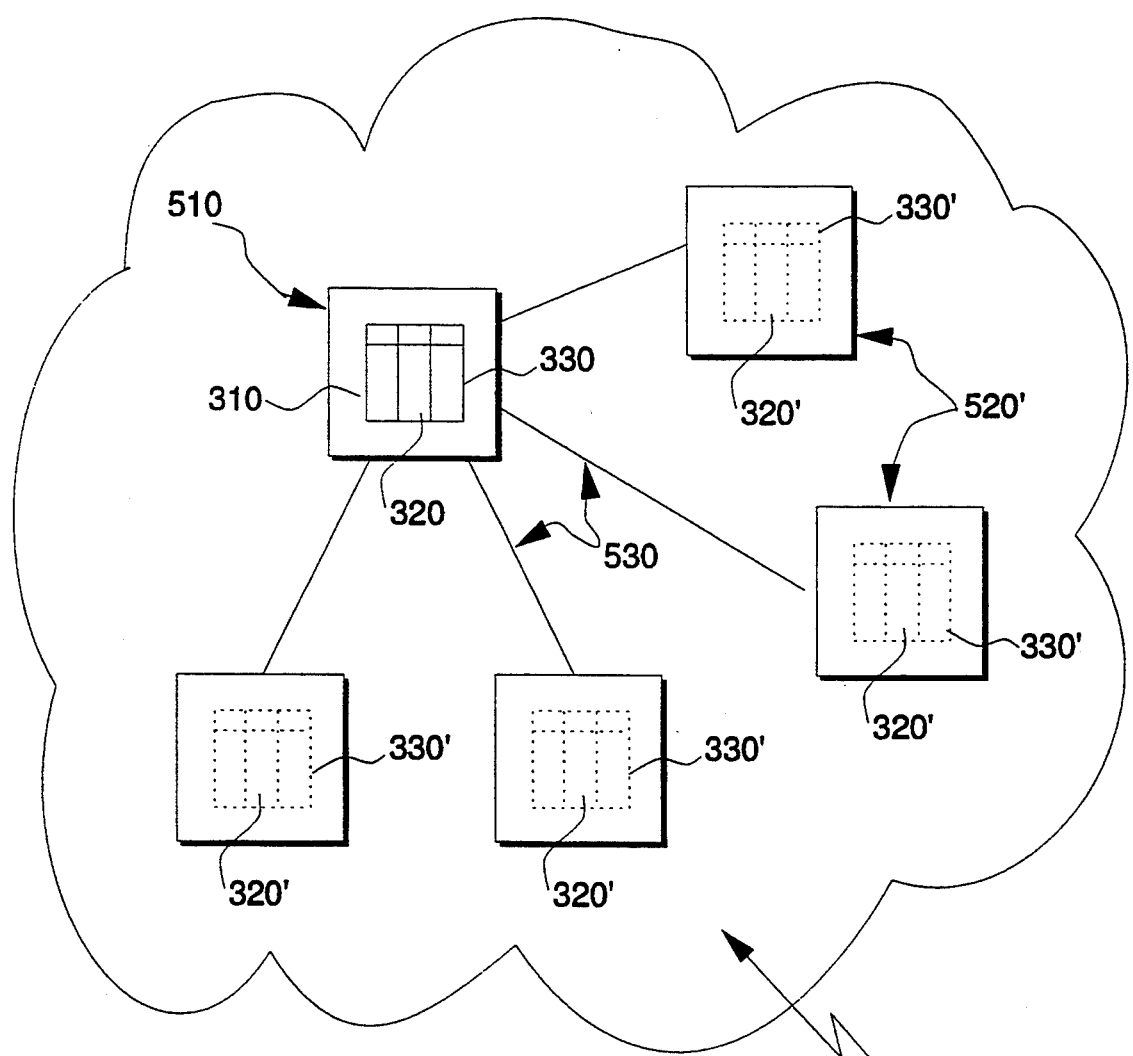
FIG. 5 is an illustration of the transfer of the control table from a central node to remote nodes.

Another feature of the call control tables of the present invention is that, because the different information categories are separate, certain parts of the tables can be made portable to other data processors within an enterprise environment. For example, as shown in FIG. 5, the protocol information part 330 of the call control tables could be maintained centrally 510 with copies 330 being propagated to remote processors 520 as required.

Call routing tables (CRT) for incoming calls are configured and used in a very similar way to the outgoing call routing tables. There are generally only two different categories of call control information which are given separate entries in the routing table. These are a security entry type for checking that the incoming call meets user acceptance criteria, and a protocol entry type for selecting the B-channel protocol according to the calling party's requirements. These information elements are stored against a call type name (see below). In addition to this, individual application programs must specify which call types they will accept. In a static routing table implementation the system user configures a table with separate named entries for protocol types and for security types. Application programs running on the system specify security and protocol combinations for the incoming calls they wish to receive. A general call type name is associated with each call type by the individual applications. This application-assigned name is the not the same thing as the names of specific elements of call control information which are part of the call control table entries. Instead these call type names are labels for the call types in which the application is interested, which can be used by the application when enabling or disabling—i.e. initiating acceptance or stopping acceptance of this type of call. For example, an application program (or other entity) wishing to receive all calls using a particular protocol from a particular calling party may specify an instruction such as:

LISTEN(NAME1, CUSTOMER1, X25)

meaning route to the particular application program which is using this instruction calls from the network entity CUSTOMER1 which use the protocol X.25. The call routing table provides the call control information for these entries and routes any incoming calls of the specified type to the application. This does not necessarily mean that the application has to accept the call as there may be means for the application to decide which of the calls that are routed to it will be accepted. To stop accepting calls of a specific type (i.e. to disable or delete the call type), the application need use only the specified call type name and a system function for disabling or deleting (for example an instruction DISABLE(NAME1)).

Where it is not required to limit either to specific security or to specific protocol types, the application can specify just one of these parameters in conjunction with a call type name. For example, an application may specify routing table entries using, for example, only a call type name (e.g. NAME2) and a security specification (e.g. CUSTOMER2,which specifies the calling party number and user-to-user information).Such a specification means that the application will accept any call from the calling party designated by CUS- TOMER2 using any protocol (within the constraints of what is usable by the application). Another type of routing table entry consists of a name and specification of a protocol type only, which results in acceptance by the application of any incoming call specifying that protocol. A default entry is specified for each category of information to deal with use of null entries in the specification of a call type by the incoming call request. In an alternative embodiment, pointers may be provided between entries in the different information categories (for example so that it is provided that a call from CUSTOMER3 with an unspecified protocol will use LAPB).

When a request for communication with a local entity is received via the ISDN D-channel, as shown in FIG. 4, the routing table for incoming calls is scanned sequentially 440 for entries corresponding to the transmitted call control information (security and protocol details). If there is no corresponding entry for either one of the specified information elements, the call request is rejected 450 and the rejection conveyed 460 to the calling party via the ISDN.

When entries corresponding to the request are found within the call routing table, a check is then made 470 of whether any application program is set up to receive such call types (i.e. combinations of security and protocol information). Only one application at a time may beset up to receive a particular call type. Following a positive result of the check 470, the call request is routed 480 to the application. Following a negative result, the call request is rejected 450.

In the present embodiment, it is a matter to be decided by the individual application program whether to accept any call request routed to it. In an alternative embodiment, the present invention may provide for a call to be held for a period when no application is currently able to receive such call types in case an application should be so enabled in the future. This is unlikely to be appropriate in an ISDN implementation since the network automatically rejects the call after a very short period if there is not acceptance.

Although the embodiments of the invention described above use a combination of address security, and protocol information and associated names, it should be understood that the information entries in the call control tables may comprise other parameters to be used in the routing of calls.

What is claimed is:

1. A method of routing calls between or within nodes (10, 20) in a switched digital network, comprising the steps of: establishing a call control table (300) for storing call control information for specific call types, said call control information for a specific call type being separated into different categories of information, the information of the different categories being stored as separate table entries (340, 360, 380) in separate parts of said call control table; in response to a request from one of said nodes (10, 20) for a call of a specific type to be made, examining said call control table (300) for call control information for said call type; and using the call control information stored for said call type to route the call, wherein the call control table is adapted for associating an element of a first category of call control information, which is stored as a single table entry in a first part of the call control table, with multiple table entries for one of the other call control information categories stored in a different part of the call control table, such that said single table entry simultaneously forms part of the stored call control information for a plurality of different call types.

2. A method of routing calls according to claim 1, wherein:
separate call control tables are established at one of said nodes (10,20) for incoming calls and for outgoing calls respectively.

3. A method of routing calls according to claim 2 wherein:
separate categories of information are stored in separate call control tables (310,320,330).

4. A method of routing calls according to claim 3, wherein:
one or more of said separate call routing tables (310,320,330) is maintained at a central node with copies being propagated to remote nodes following changes to the table at the central node.

5. A method of routing calls according to claim 4, wherein:
each entry in each category of call control information includes a name which is unique for the category.

6. A method of routing calls according to claim 5, wherein:
a network entity specifies call types which it will accept, incoming calls of such types being subsequently routed to said entity.

7. A method of routing calls according to claim 6, wherein:
the specification of call types comprises specification of a type in any one or all of the plurality of different categories of call control information.

8. A node for use in a switched digital network for routing a call of a specific call type of a set of different call types, said network having a plurality of nodes connected therein, said node comprising: means for storing call control information for each type of said set of different call types comprising means for storing, for each call type, different categories of call control information in separate parts of said call control table; means for examining said call control table for call control information for a specific call type, in response to a request from one of said nodes for a call of said type to be made; and means for routing the call according to the call control information stored for said call type, wherein the call control table is adapted for associating an element of a first category of call control information, which is stored as a single table entry in a first part of the call control table, with multiple table entries for one of the other call control information categories stored in a different part of the call control table, such that said single table entry simultaneously forms part of the stored call control information for a plurality of different call types.

9. A switched digital network comprising a plurality of nodes, each node for muting a call of a specific call type of a set of different call types, each node comprising means for storing call control information for each type of said set of different call types in a call control table, said means for storing call control information for each type, of different call types comprising means for storing, for each call type, different categories of call control information in separate parts of said call control table; means for examining said call control table for call control information for a specific call type, in response to a request from one of said nodes for a call of said type to be made; and means for routing the call according to the call control information stored for said call type, wherein: a first one of said nodes having means for maintaining a table of one or more of said separate parts of stored categories of call control information and means for propagating copies of said table to other nodes within the network, wherein the call control table is adapted for associating an element of a first category of call control information, which is stored as a single table entry in a first part of the call control table, with multiple table entries for one of the other call control information categories stored in a different part of the call control table, such that said single table entry simultaneously forms part of the stored call control information for a plurality of different call types.

* * * * *